United States Patent [19]
Thorborg

[11] 3,740,638
[45] June 19, 1973

[54] CONVERTER CIRCUIT FOR GENERATION OF ASYMMETRIC REACTIVE POWER

[75] Inventor: Kjeld Thorborg, Vasteras, Sweden

[73] Assignee: Allmanna Svenska Elektriska Aktiebolaget, Vastera, Sweden

[22] Filed: Jan. 18, 1972

[21] Appl. No.: 218,790

[30] Foreign Application Priority Data

Jan. 18, 1971 Sweden..........................507/71

[52] U.S. Cl.................. 321/5, 321/27 R, 323/105, 323/119, 323/127
[51] Int. Cl. .......................................... H02m 7/22
[58] Field of Search ..................... 317/47; 323/100, 323/105, 106, 107, 110, 119, 120, 124, 127; 321/5, 7, 27 R, 52, 54

[56] References Cited
UNITED STATES PATENTS
1,655,038 1/1928 Alexanderson..................... 323/119
3,444,450 5/1969 Koppelmann...................... 321/5 X
1,947,231 2/1934 Sabbah............................... 323/1 A FOREIGN PATENTS OR APPLICATIONS
259,256 4/1970 U.S.S.R................................ 321/5
156,606 8/1963 U.S.S.R............................ 321/27 R
1,265,288 4/1968 Germany ................................ 321/5

Primary Examiner—J. D. Miller
Assistant Examiner—H. Huberfeld
Attorney—Jennings Bailey, Jr.

[57] ABSTRACT

A converter connection for improving the symmetry of a three-phase network comprises a three-phase line-commutated controlled converter which has its AC terminals connected to the network and its DC terminals to a reactor. Firing pulses are supplied to the rectifiers of the three rectifier groups of the converter, each of which comprises the two rectifiers connected to one of the three phase conductors of the network to fire the two rectifiers of each group at a fixed 180° interval. The phase angle in relation to the AC network voltage of the firing pulses is individually controlled for each of the three groups in dependence upon the deviation of the AC voltage of a point in the network from a reference level, the reference levels of the three groups being substantially equal.

9 Claims, 2 Drawing Figures

3,740,638

CONVERTER CIRCUIT FOR GENERATION OF ASYMMETRIC REACTIVE POWER

BACKGROUND OF THE INVENTION

1. Field of the Invention

The present invention relates to a converter connection for connection to a three-phase alternating network.

2. The Prior Art

Certain three-phase alternating voltage sources, for example load-commutated converters, are sensitive to asymmetrical loading. This is because they have a relatively high inner impedance for the negative sequence system of the load current. If the load is asymmetrical, such a negative sequence system occurs and this causes a relatively high inner "negative sequence voltage drop" in the voltage source, causing the output voltage of the source to be asymmetrical.

With this type of voltage source, therefore, certain asymmetry of the load gives rise to a relatively pronounced asymmetry in the voltage, or which is the same thing, at a certain maximum permitted asymmetry of the voltage, only slight asymmetry of the load can be permitted. This implies a serious limitation of the usefulness of these voltage sources.

SUMMARY OF THE INVENTION

The invention refers to a converter connection for connection to such a network, sensitive to asymmetrical loading. According to the invention a converter connection for improving the symmetry of a three-phase network comprises a three-phase line-commutated controlled converter which has its AC terminals connected to the network and its DC terminals to a reactor. A pulse generating means supplies firing pulses to the rectifiers of the converter. The converter has three rectifier groups, each group comprising the two rectifiers connected to one of the three phase conductors of the network. Within each group the two rectifiers are fired with a fixed 180° interval. The phase angle in relation to the AC network voltage of the firing pulses is individually controlled for each of the three groups in dependence upon the deviation of the AC voltage of a point in the network from a reference level. The reference levels of the three groups are substantially equal. The connection generates the negative sequence load current consumed by the load, and the network (voltage source) will not therefore be loaded with any negative sequence current. This eliminates the disadvantages mentioned above.

BRIEF DESCRIPTION OF THE DRAWING

The invention will be further described with reference to the accompanying FIGS. 1 and 2.

DESCRIPTION OF THE PREFERRED EMBODIMENT

Figure 1:
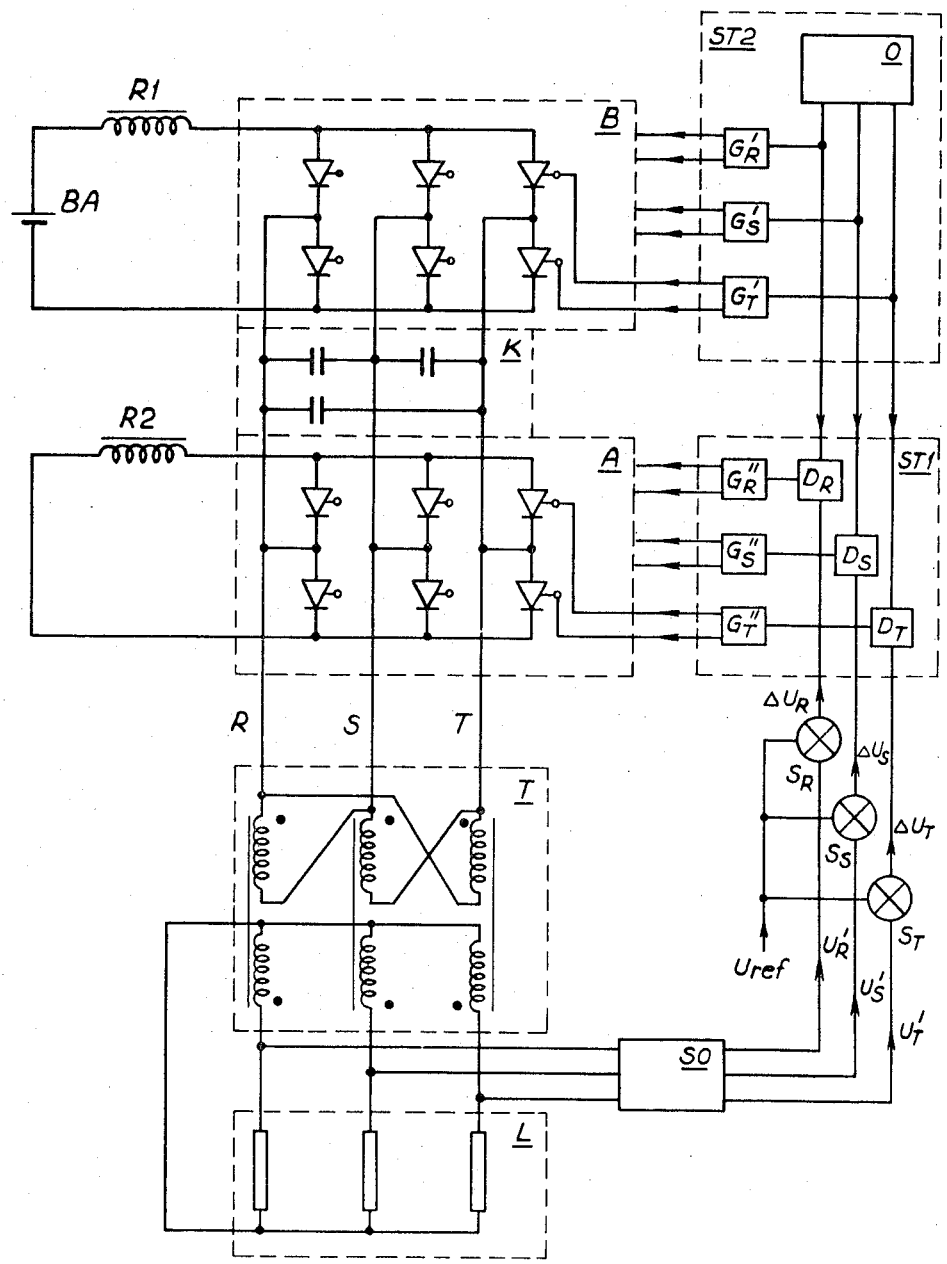
FIG. 1 shows an embodiment in which the converter connection consists of a single, controlled three-phase bridge with a reactor connected to the DC terminals.

FIG. 1 shows a converter B comprising a conventional three-phase bridge with six thyristors. The bridge is connected on the DC side over a reactor R1 to a DC source BA. The AC side of the bridge is connected to an AC network consisting of the phase-conductors R, S, T. The thyristors of the converter are controlled from a control device ST2, comprising the oscillator O and the three control pulse devices $G'_R$, $G'_S$ and $G'_T$. The oscillator delivers a symmetrical three-phase pulse train having a frequency corresponding to the desired alternating voltage. The control pulse device $G'_R$ emits firing pulses, mutually displaced 180°, to the two thyristors connected to the phase conductor R. The same is true for the control pulse devices $G'_S$ and $G'_T$. The converter B is arranged to operate in inverter operation and thus feed active power from the DC source BA to the three phase network R, S, T.

A three-phase load object L is connected to the network over a three-phase transformer T. If an asymmetrical load current were to be extracted, the inner negative sequence voltage drop of the converter B would be high which, as mentioned previously, would result in a pronounced asymmetry in the network voltage.

This is prevented by connecting a converter connection according to the invention to the network. It consists of the controlled, three-phase bridge A, to the DC terminals of which the reactor R2 is connected, as well as the capacitor bank K.

The converter A is controlled by the control device ST1. The two thyristors connected to the phase-conductor R obtain firing pulses, mutually displaced 180°, from the control pulse device $G''_R$, and the same applies to the thyristors connected to S and T and the control pulse devices $G''_S$ and $G''_T$. The control device also includes the phase-shifting circuits $D_R$, $D_S$ and $D_T$. These are supplied with pulses from the oscillator O and supply to the control pulse devices $G''_R$, etc., pulses phase-displaced in relation to the oscillator pulses. The magnitude of the phase displacement is determined for each phase-shifting device by a signal $\Delta U_R$, $\Delta U_S$ or $\Delta U_T$, respectively, supplied to the device. The control signal is formed in a comparison device $S_T$, $S_S$ and $S_T$, respectively as the difference between a reference magnitude $U_{ref}$, which is the same for all the comparison devices, and a voltage, $U'_R$, $U'_S$ and $U'_T$, respectively, dependent on the voltage of respective phase conductors. The voltages of the three-phase network are sensed near the load object L and converted in a signal-converter SO to the three voltages $U'_R$, $U'_S$ and $U'_T$.

Since the two DC terminals of the converter A are joined over a reactor (R2) which in the first approximation may be assumed to have the resistance zero, the average value of its direct voltage will be zero. In principle then the converter uses only reactive but no active power. The delay angles of the two converters A and B will be automatically so adjusted in relation to each other and to the network voltage that the reactive power consumed by the converter A (together with the reactive power consumed by other objects connected to the network, for example the load L) will be equal to the reactive power generated by the capacitor bank K.

If the load L is asymmetrical, the currents in the phase conductors will be different from each other. Due to the inner voltage drops in the voltage source (converter B) and in the transformer, therefore, the three phase or main voltages at the load object L will differ from each other. This means that the three signals $U'_R$, $U'_S$ and $U'_T$ differ by varying amounts from the reference magnitude $U_{ref}$. The phase displacement in the phase-shifting circuits $D_R$, $D_S$ and $D_T$ are arranged, as mentioned, to be dependent on the error signals $\Delta U_R$, $\Delta U_S$ and $\Delta U_T$. The control angle for each pair of bridge branches connected to a phase conductor will therefore differ from the delay angles of the other two pairs of bridge branches if the load is asymmetrical. In this case, the converter constitutes an asymmetrical load and its load current thus includes a negative sequence component, the phase position and amplitude of which are dependent on the magnitudes $\Delta U_R$, $\Delta U_S$ and $\Delta U_T$, and thus ultimately upon the degree of asymmetry of the network voltage at the load object L.

The feedback sign in the closed control circuit formed by SO, the three comparison members $S_R$, $S_S$ and $S_T$, the three phase-shifting members $D_R$, $D_S$ and $D_T$, the three control pulse devices $G''_R$, $G''_S$ and $G''_T$, the converter B, the phase conductors and transformer, is chosen so that the feedback will be negative, i.e. that the circuit endeavors to reduce the deviations $\Delta U_R$, $\Delta U_S$ and $\Delta U_T$. The control circuit will thus automatically adjust the three control angles in the converter A in such a way that the three signals $U'_R$, $U'_S$ and $U'_T$ will be equal, thus achieving symmetry of the network voltage at the load L. Thus, in principle in this state the negative sequence current taken up by the converter A will have the same amplitude, but opposite phase position, as the negative sequence current taken up by the load L. It may thus be considered that the converter generates the negative sequence current consumed by the load. The converter B is then loaded with a positive sequence current only, its inner voltage drop will be low, and there will be a purely positive sequence voltage drop, so that the three phase conductor voltages will form a symmetrical system.

What has been stated above is modified slightly because the voltage is regulated to symmetry after the transformer. Because of the negative sequence voltage drop in the transformer, therefore, the phase conductors R, S, T will form a slightly asymmetrical voltage system, whereas the load voltage will be completely symmetrical.

Alternatively the DC source BA may be connected in series with the reactor R2. It will then be the converter B which delivers the capacitive power to the capacitors and the converter A delivers the active power and the negative sequence current.

Figure 2:
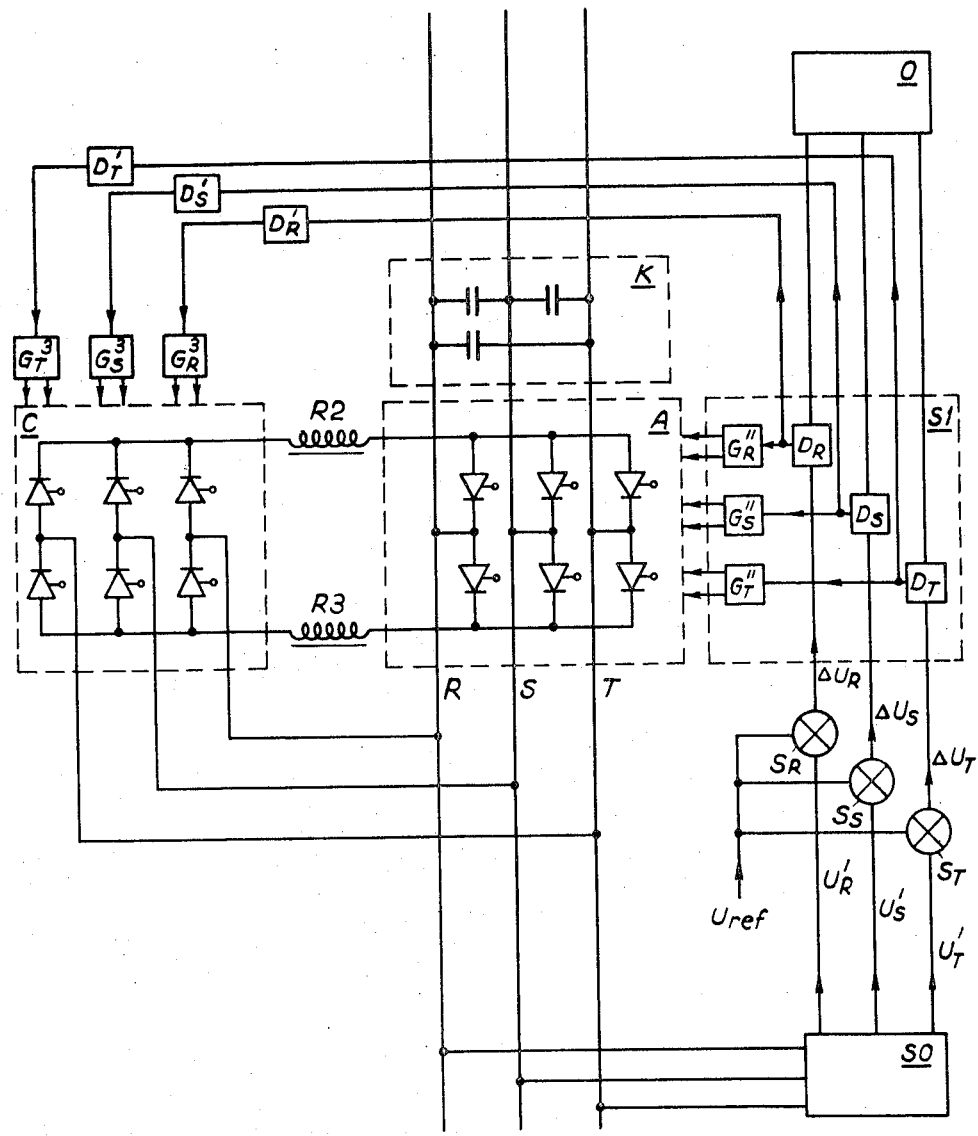
In FIG. 2 the converter connection consists of a double converter.

FIG. 2 shows another embodiment of the converter connection according to the invention. An additional converter C is connected to the network R, S, T as well as the converter A. The DC terminals of the bridges are connected to each other over the reactors R2 and R3, and the bridges are DC anti-parallel-connected. The bridge A is controlled, as in FIG. 1, by the oscillator O through the phase-shifting devices $D_R$, $D_S$, $D_T$. The terminals of the latter devices are connected over the phase-shifting devices $D'_R$, $D'_S$, $D'_T$ to the control pulse devices $G^3_R$, $G^3_S$, $D^3_T$, which deliver control pulses to the rectifiers in C in the same way as in A. $D'_R$, $D'_S$, $D'_T$ are so arranged that each rectifier in C is fired with a certain predetermined delay in relation to the corresponding rectifier in A. This delay may suitably be adjusted to correspond to about 30 electrical degrees. The basic harmonics of the alternating currents of the two bridges will thus be 30° phase-displaced, i.e. they will be added practically algebraically. The most important overtones are usually the fifth and seventh harmonics. The fifth harmonic in the current of one bridge will be phase-displaced $5 \cdot 30° = 150°$ in relation to the fifth harmonic in the current of the other rectifier bridge, so that the fifth harmonics in the two currents will to a large extent cancel each other out. The same thing is true for the seventh harmonic, where the value of the phase displacement will be $7 \cdot 30° = 210°$. In the example shown, the fifth and seventh harmonics have to a large extent been eliminated from the total alternating current of the converter connection, which will become almost sine-shaped, thus reducing or eliminating the need of filters.

Instead of the value 30° given above for the phase displacement between A and C, some other value may of course be selected, depending on which overtone(s) are to be reduced. For example, the fifth harmonics are eliminated completely at $180°/5 = 36°$ and the seventh harmonics at $180°/7 \cong 26°$.

The converter A will adjust itself so that the average value of its direct voltage will be equal to and opposite to the direct voltage of the bridge C. The direct current through the reactors, and thus the current on the AC side of the bridge, will be proportional to the difference between the two direct voltages. The control system adjusts the control angle for each pair of branches in the bridge A connected to a phase conductor so that said difference voltage provides such a large current that the bridges generate the required capacitive power and also so that the bridges generate the negative sequence current required to obtain symmetry in the line voltage.

The reactors R1, R2, R3 are intended to smooth the direct current. The need for reactance decreases with increasing direct current. Each reactor may therefore be replaced, for example, by one reactor having high reactance which is saturated at relatively low current, and a second one with lower reactance which is saturated at a current of the same magnitude as the maximum direct current occurring. In this way the total rated power of the reactors can be considerably reduced, which results in a substantial reduction in their price, weight and space requirements.

I claim:

1. Converter connection for connection to a three-phase alternating voltage network, which comprises a three-phase capacitor bank connected to the network, and a first three-phase converter of the line-commutated type having controlled rectifiers, having AC terminals connected to the network and DC terminals connected to a first reactor, the converter comprising a first pulse-generating member arranged to emit to each group of rectifiers connected to the same AC phase conductor control pulses for ignition of the rectifiers in the group with a constant phase displacement, substantially equal to 180°, between the rectifiers in the group, and in which each group is provided with an individual control device to control the ignition angle of the rectifiers in the group in accordance with the deviation between the voltage at a point in the network and a reference voltage, the reference voltages supplied to said control devices being substantially equal.

2. Converter connection according to claim 1, in which the first pulse-generating member comprises one phase shifting device for each group of rectifiers and in which each phase shifting device includes means to emit to the rectifiers in the group control pulses with a phase displacement in relation to the voltage in the alternating voltage network dependent upon said deviation.

3. Converter connection according to claim 1, in which a transformer is connected between the converter and a load object, and in which said individual control device includes means to measure the voltage in the network at a point located between the transformer and the load object.

4. Converter connection according to claim 1, in which a direct voltage source is connected in series with the first reactor.

5. Converter connection according to claim 4, in which said direct voltage source comprises a further converter of the line-commutated type, means connecting the DC terminals of said further converter to the DC terminals of said first converter, said first reactor and a further reactor being connected in said connecting means in such a way that a DC path is produced in turn through the first converter, the first reactor, the further converter and the further reactor.

6. Converter connection according to claim 1, in which a second three-phase converter of the line-commutated type with controlled rectifiers is connected by its AC terminals to the network and by its DC terminals to a second reactor.

7. Converter connection according to claim 6, in which said second converter comprises a second pulse-generating member including means to supply the rectifiers of the converter with control pulses in such a way that the time interval between successive control pulses is always equal.

8. Converter connection according to claim 7, in which the first pulse-generating member comprises one phase-shifting device for each of said groups of rectifiers, said second pulse-generating member supplies pulses to the phase-shifting devices and the phase-shifting devices include means to emit to the rectifiers in the group control pulses with a phase-displacement in relation to the pulses supplied to the phase-shifting devices dependent on said deviation.

9. Converter connection according to claim 6, in which a DC source is connected in series with said second reactor.

* * * * *